United States Patent
Ishii et al.

(10) Patent No.: US 9,745,448 B2
(45) Date of Patent: Aug. 29, 2017

(54) METHOD FOR PRODUCING VINYL AMINE UNIT-CONTAINING POLYMER SOLUTION

(71) Applicant: Mitsubishi Chemical Corporation, Tokyo (JP)

(72) Inventors: Akihiro Ishii, Yokohama (JP); Yasuharu Mori, Yokohama (JP)

(73) Assignee: Mitsubishi Chemical Corporation, Tokyo (JP)

( * ) Notice: Subject to any disclaimer, the term of this patent is extended or adjusted under 35 U.S.C. 154(b) by 26 days.

(21) Appl. No.: 14/436,762

(22) PCT Filed: Oct. 31, 2013

(86) PCT No.: PCT/JP2013/079554
§ 371 (c)(1),
(2) Date: Apr. 17, 2015

(87) PCT Pub. No.: WO2014/069571
PCT Pub. Date: May 8, 2014

(65) Prior Publication Data
US 2015/0259508 A1 Sep. 17, 2015

(30) Foreign Application Priority Data

Nov. 2, 2012 (JP) .................................. 2012-242947
Oct. 28, 2013 (JP) .................................. 2013-223271

(51) Int. Cl.
| | |
|---|---|
| *C08F 26/02* | (2006.01) |
| *C08K 5/41* | (2006.01) |
| *C08F 216/14* | (2006.01) |
| *C08K 3/30* | (2006.01) |
| *C08K 3/38* | (2006.01) |
| *D21H 17/37* | (2006.01) |
| *D21H 21/10* | (2006.01) |
| *C08F 8/12* | (2006.01) |

(52) U.S. Cl.
CPC ................. *C08K 5/41* (2013.01); *C08F 8/12* (2013.01); *C08F 26/02* (2013.01); *C08F 216/14* (2013.01); *C08K 3/30* (2013.01); *C08K 3/38* (2013.01); *D21H 17/375* (2013.01); *D21H 21/10* (2013.01)

(58) Field of Classification Search
CPC .... C08K 3/30; C08K 5/41; C08K 3/38; C08F 26/02; C08F 8/12; D21H 21/10
See application file for complete search history.

(56) References Cited

U.S. PATENT DOCUMENTS

| 4,843,118 A | 6/1989 | Lai et al. |
| 6,797,785 B1 | 9/2004 | Hund et al. |
| 2011/0230583 A1 | 9/2011 | Shimizu |

FOREIGN PATENT DOCUMENTS

| JP | 11-292908 | 10/1999 |
| JP | 2004-27015 | * 1/2004 |
| JP | 2004 27015 | 1/2004 |
| JP | 2004-27015 A | 1/2004 |
| JP | 2006-257287 | * 9/2006 |
| JP | 2006 257287 | 9/2006 |
| JP | 2006-257287 A | 9/2006 |
| JP | 2010 59220 | 3/2010 |

OTHER PUBLICATIONS

International Search Report Issued Feb. 4, 2014 in PCT/JP2013/079554 Filed Oct. 31, 2013.
International Preliminary Report on Patentability and Written Opinion issued May 14, 2015 in PCT/JP2013/079554.
Supplementary Search Report as received in the corresponding European Patent Application No. 13851445.0-1301 dated Jul. 21, 2015.

\* cited by examiner

*Primary Examiner* — Peter D Mulcahy
(74) *Attorney, Agent, or Firm* — Oblon, McClelland, Maier & Neustadt, L.L.P.

(57) ABSTRACT

Provided is a method for efficiently producing on an industrial scale a high-performance polyvinylamine solution having good handling properties. After producing a polymer containing N-vinylcarboxamide monomer units having a value of the weight average molecular weight (Mw)/number average molecular weight (Mn) of 5 or higher by aqueous solution standing adiabatic polymerization, the polymer is hydrolyzed in an aqueous solvent in the presence of an alkali and an antigelling agent. In a preferred embodiment of the present invention, a polymer powder having a volatile content of 0.1-12% by mass is obtained by drying and pulverizing after producing a (co)polymer, and the powder obtained is stored or transported to the site of use of the polymer solution and hydrolyzed in an aqueous solvent in the presence of an alkali and an antigelling agent when the polymer solution is needed or at the site of use of the polymer solution.

11 Claims, No Drawings

METHOD FOR PRODUCING VINYL AMINE UNIT-CONTAINING POLYMER SOLUTION

TECHNICAL FIELD

The present invention is related to a method for producing a vinyl amine unit-containing polymer solution, and in detail, relates to a method for producing a vinyl amine unit-containing polymer solution of high molecular weight that is useful particularly as a flocculant in wastewater treatment, and additionally as a paper-making chemical in the paper manufacturing industry, etc. It should be noted that, in the following descriptions, vinyl amine unit-containing polymer may be abbreviated simply as polyvinylamine.

BACKGROUND ART

Polyvinylamine is a useful substance widely used as a flocculant, papermaking chemical, fiber treatment agent, paint additive, etc. High-molecular weight polyvinylamine is said to be particularly effective in cases of using as a flocculant in wastewater treatment or as a papermaking chemical in the paper manufacturing industry.

Generally, polyvinylamine is obtained by hydrolyzing the entirety or part of a polymer or copolymer of N-vinylcarboxamide (hereinafter both are collectively noted as (co)polymer), under the presence of acid or alkali. However, upon high-molecular weight polyvinylamine being made into an aqueous solution, there are problems such as being difficult to handle due to becoming very high viscosity, while handling becomes easy if diluted, but leads to cost increases in production and transport.

Conventionally, a method of making an aqueous solution by alkaline hydrolysis of polymer powder of N-vinylcarboxamide has been proposed, and in this case, it is said that a high-molecular weight product having a reduced viscosity of at least 9 is favorable as the (co)polymer of N-vinylcarboxamide (Patent Document 1). However, the obtained aqueous solution has high viscosity, and thus the handling is very difficult. In addition, an aqueous solution standing adiabatic polymerization method has been proposed as a polymerization method of N-vinylcarboxamide (Patent Document 2). However, in this proposal, the conversion method to polyvinylamine and functionality thereof are not explained.

Hydrolysis of N-vinylcarboxamide (co)polymer to polyvinylamine carried out at alkaline conditions is advantageous in industry. In other words, in acidic hydrolysis, corrosion resistance is required in all of the equipment plumbing related to production, transport, storage and use; whereas, at alkaline conditions, it is possible to use device plumbing made from normal steel and stainless steel.

In addition, solutions are advantageous as the product form. In other words, in the production of a powder finished product, a powder drying process is essential; however, the finished product deteriorates if the polyvinylamine is heated to high temperature, and the solubility of the finished product worsens. Such deterioration is a very important problem particularly in papermaking chemicals which require high solubility. Furthermore, with powders, equipment for dissolving upon use is necessary.

For the above-mentioned reasons, it is preferable to be alkaline and a uniform solution state as the product form, and this matter has already been known (Patent Document 1). However, countermeasures against aqueous solutions of high-molecular weight polyvinyl amine becoming very high viscosity have not been proposed.

Patent Document 1: Japanese Unexamined Patent Application, Publication No. 2004-27015
Patent Document 2: Japanese Unexamined Patent Application, Publication No. 2010-59220

DISCLOSURE OF THE INVENTION

Problems to be Solved by the Invention

As mentioned above, a method for industrially producing a high-performance polyvinyl amine solution product under alkaline conditions and obtaining a commercial product having good handling properties has yet to be proposed. In other words, with conventional methods, in the case of raising the molecular weight in order to improve the performance as a papermaking chemical, since the viscosity of the product rises, there is a problem in that the handling properties worsen. In the case of lowering the product concentration in order to address this, there is a problem in that the costs of production and transport rise.

Means for Solving the Problems

The present inventors, as a result of taking into account the above-mentioned current situation and thoroughly researching, found that the performance of papermaking chemicals, above all retention and drainage aids, have a difference in performance if the molecular weight distribution differs even if the same reduced viscosity, that the molecular weight distribution differs depending on the polymerization method, that the polyvinyl formamide produced by an adiabatic polymerization method exhibits superior performance even when the molecular weight distribution is broad and the comparative average molecular weight is low, and that, for this reason, a polyvinylamine aqueous solution that is high performance in papermaking chemicals, etc. even when the comparative viscosity is low can be made when making into an aqueous solution, thereby arriving at the present invention.

In other words, the gist of the present invention exists in a method for producing a vinylamine unit-containing polymer solution that produces a polymer containing N-vinylcarboxamide monomer units and having a value of weight average molecular weight $M_w$/number average molecular weight $M_n$ of at least 5 by an aqueous solution adiabatic polymerization method, and then performs hydrolysis on the polymer in an aqueous solvent under the presence of alkali and an antigelling agent.

Effects of the Invention

According to the present invention, it is possible to efficiently produce on an industrial scale a polyvinylamine solution having good handling properties, while being high performance. Such a high-molecular weight polyvinylamine solution has broad applicability in a variety of field, including as a papermaking chemical in the papermaking industry in particular, and thus is very useful.

It should be noted that (co)polymer powders handled in the middle of the production method of the present invention can be stored for a long time, can be handled easily, and can obtain a polyvinylamine solution by dissolving as is in an alkali aqueous solution and heating. Therefore, a polyvinylamine aqueous solution is producible when necessary at the location of use thereof, which can reduce the transport cost and storage cost, and thus is economically advantageous. In addition, since there is no need to store a polyvinylamine aqueous solution, which tends to degrade, for a long time, it is advantageous also in quality.

PREFERRED MODE FOR CARRYING OUT THE INVENTION

The present invention will be explained in further detail hereinafter.
(Vinylcarboxamide (Co)Polymer)

The N-vinylcarboxamide used in the present invention is expressed by the general formula: $CH_2=CH-NHCOR$ (in the formula, R represents a hydrogen atom or a C1-C6 alkyl group). More specifically, N-vinyl formamide (R=H) or N-vinyl acetamide (R=$CH_3$), and additionally, N-vinyl propionic acid amide (R=$C_2H_5$), N-vinyl butyric acid amide (R=$C_3H_7$), etc. are exemplified; however, N-vinyl formamide is preferable due to ease of deriving as polyvinylamine.

N-vinylcarboxamide can be copolymerized with any monomer having an ethylenically unsaturated bond as necessary. Specifically, (meth)acrylic acid and salts thereof, (meth)acrylic acid esters, (meth)acrylonitrile, (meth)acrylamide, N-alkyl(meth)acrylamides, N,N-dialkyl(meth)acrylamides, dialkylaminoethyl(meth)acrylamides and salts or quaternarized products thereof, dialkylaminopropyl(meth)acrylamides and salts or quaternarized products thereof, diacetone acrylamide, N-vinyl pyrrolidone, N-vinyl caprolactam and vinyl acetate can be exemplified as monomers that can be copolymerized.

The content ratio of N-vinyl carboxamide in the monomer composition may vary depending on the objective (co)polymer; however, it is normally at least 5 mol %, preferably at least 10 mol %, more preferably at least 50 mol %, and particularly preferably 70 to 100 mol %. With more N-vinylcarboxamide monomer, the characteristics thereof are exhibited more. It should be noted that the above-mentioned monomer composition is reflected as the composition of the (co)polymer.

For the polymerization of the monomer composition, the aqueous solution standing adiabatic polymerization method is selected. Herein, the standing adiabatic polymerization method is a method of polymerizing in a reaction vessel that does not include a device for removing the reaction heat or an agitation device during polymerization. Upon aqueous solution polymerization, the temperature in the system rises due to heat not being removed despite producing heat. For this reason, if the monomer concentration is excessively raised, it will boil, and if lowered excessively, the production efficiency will be poor. In addition, in order to broaden the molecular weight distribution, it is preferable for there to be a greater difference between the polymerization initiation temperature and the end temperature, and for this reason, a high monomer concentration is more preferable. The monomer concentration is usually 10 to 50% by mass, preferably 20 to 40% by mass, and more preferably 25 to 35% by mass. Although it is preferable to lower the polymerization initiation temperature in order to raise the polymer concentration without boiling, since it will freeze if lowered too much, it is selected from the range of −10 to +20° C. normally, and −10 to +10° C. preferably.

The aqueous solution polymerization is carried out by way of a radical polymerization initiator. As the radical polymerization initiator, it is possible to use a usual redox initiator, azo initiator and peroxide, in addition to jointly using these. These initiators may be either water soluble or oil soluble; however, in the case of using an oil-soluble initiator, it is necessary to add to dissolve in a water-miscible solvent.

As examples of the water-soluble azo initiator, 2,2'-azobis (amidinopropane)dihydrochloride, 2,2'-azobis[2-(5-methyl-2-imidazolin-2-yl)propane]dihydrochloride and 4,4'-azobis (4-cyano-valeric acid), etc. can be exemplified.

As examples of the oil-soluble azo initiator, 2,2'-azobis-isobutyronitrile, 1,1'-azobis(cyclohexanecarbonitrile), 2,2'-azobis(2-methyl butyronitrile), 2,2'-azobis(2-methyl propionate) and 2,2'-azobis(4-methoxy-2,4-dimethyl) valeronitrile, etc. can be exemplified.

In addition, as examples of the redox initiator, combinations of ammonium peroxodisulfate with sodium sulfite, sodium hydrogen sulfite, trimethylamine, tetramethyl ethylenediamine, etc., and combinations of t-butyl hydroperoxide with sodium sulfite, sodium hydrogen sulfite, ferrous sulfate, etc. can be exemplified.

As examples of the peroxide, ammonium or potassium peroxodisulfate, hydrogen peroxide, benzoyl peroxide, lauryl peroxide, octanoyl peroxide, succinic peroxide and t-butyl peroxy-2-ethyl hexanoate, etc. can be exemplified.

The most preferred among these initiators are the joint uses of a redox initiator that initiates polymerization at low temperature and a water-soluble azo initiator that initiates at a comparatively high temperature, and thus jointly uses a combination of t-butylhydroperoxide and sodium sulfite, sodium hydrogen sulfite or ferrous sulfate as the redox initiator, and 2,2'-azobis(2-amidinopropane)dihydrochloride as the aqueous azo initiator. It is thereby possible to cause polymerization to complete, even if the polymerization temperature greatly differs at the end time from the polymerization initiation time.

The amount used of the polymerization initiator relative to monomer, in the case of an azo initiator, is normally 100 to 10000 ppm, and preferably 500 to 5000 ppm, and in the case of a redox initiator, is normally 10 to 700 ppm, and preferably 30 to 600 ppm. Since sufficient polymerization rate is not obtained when the amount used of the polymerization initiator is too little, and the molecular weight will decline if too great despite the polymerization rate increasing, it is not preferable.

If the molecular weight of the (co)polymer is too high, the hydrolysis process and handling operation of the finished product will not only become difficult, but also the undissolved component will increase. Furthermore, if the molecular weight distribution is broad, high performance will be obtained even if the molecular weight is lower than suggested conventionally. On the other hand, if the molecular weight is too low, the performance will decline, and the difficulty upon production such as the adhesion of gel will also increase. For this reason, for the molecular weight of the (co)polymer, in the case of establishing the value of the reduced viscosity (noted as $\eta_{sp}/C$ hereinafter) of 0.1 g/dl aqueous solution at 25° C. in 1 N brine as an index, $\eta_{sp}/C$ is normally 2 to 9, and preferably 2 to 8. In addition to the reaction temperature, initiator type and amount, adjustment thereof may be carried out using a known chain transfer agent.

As the chain transfer agent, alcohols such as isopropyl alcohol and allyl alcohol, mercaptans such as thioglycollate and thioglycerol, and phosphonates such as sodium hypophosphite.

In the case of an adiabatic polymerization method, the reason for which high performance is obtained even with low reduced viscosity than other polymerization schemes is assumed to be due to the difference in molecular weight distribution. In addition, the performance is considered to be high for the reasons such as the high molecular weight component being great even if the average molecular is the same.

Usually, the molecular weight distribution is represented by the ratio Mw/Mn of weight average molecular weight to number average molecular weight. Mw/Mn can be calculated by size exclusion chromatography, for example. Usually, it is possible to employ GPC (gel permeation chromatography) or GFC (gel filtration chromatography). The value of Mw/Mn measuring a polymer produced by the present invention by these methods is at least 5. A chain transfer agent may be used in order to keep the reduced viscosity at the value, while keeping a broad molecular weight distribution. There are no particular limitations for the chain transfer agent so long as not making Mw/Mn smaller than 5.

The aqueous solution standing adiabatic polymerization method is not particularly limited; however, it may be carried out under the presence of an inorganic salt. More specifically, it may be carried out as follows, for example. In other words, water, inorganic salt, monomer, etc. are mixed to prepare a monomer preparation adjusted in polymerization initiation temperature (homogenous aqueous solution of monomer), this is poured into an adiabatic reaction vessel, dissolved oxygen in the monomer preparation is removed by nitrogen purge, and the initiator is charged thereinto and mixed to initiate the polymerization reaction. After mixing of the initiator has completed the nitrogen purge is stopped and left to stand, the time is confirmed at which temperature within the reaction vessel reaches a maximum due to the polymerization reaction, followed by further performing aging for about 30 to 120 minutes. The product polymer after aging is taken out of the reaction vessel, thereby obtaining a massive aqueous gel of N-vinylcarboxamide polymer.

It should be noted that, although it is not particularly limited as the above-mentioned inorganic salt so long as being water soluble, metal halides are preferable from the aspect of handling properties and cost. As the metal halide, halides of alkali metals or alkali earth metals, specifically sodium chloride, potassium chloride, calcium chloride, potassium bromide, sodium bromide, etc. can be exemplified. Thereamong, chlorides can be exemplified as preferred metal halides, more specifically, due to being inexpensive, sodium chloride, potassium chloride calcium chloride, etc. can be preferably exemplified; however, thereamong, sodium chloride is more preferable. In addition, the concentration of inorganic salt is at least 7% by mass relative to the water of the homogenous aqueous solution containing monomer and is no more than the saturated solubility concentration at the polymerization initiation temperature, and is preferably no more than 80% concentration of this saturated solubility concentration.

Since gelation tends to occur easily in the subsequent denaturation process, if the residual N-vinylcarboxamide amount after polymerization is great, it is not preferable. In the case of the monomer residual amount being great, although it is possible to extraction remove with a suitable solvent, etc., when considered from the point of yield, it is more preferable for the polymerization conversion rate to be higher. From such a viewpoint, the conversion rate of N-vinylcarboxamide is normally at least 90%, preferably at least 95%, more preferably at least 98%, and particularly preferably at least 99%.

The obtained (co)polymer contains water according to the polymerization method thereof. Although it may be made into an aqueous solution by diluting as is to carry out hydrolysis, in the present invention, it is preferable to dry and powderize this by any method. By drying and powderizing, it is possible to store and transport stably with good handling properties. In addition, upon dissolving into a water-based solvent in the subsequent denaturation process, it is possible to dissolve uniformly in a short time due to the specific surface area being great.

Since it is obtained as a gel-like polymer lump in the aqueous solution standing adiabatic polymerization method, a powder can be obtained by pulverizing and drying the gel. Normally, a massive aqueous gel is made into particles by pulverizing after cutting. The average particle size during pulverizing is normally no more than 5 cm, preferably no more than 2 cm, and more preferably no more than 1 cm. As the pulverization method, although various known methods can be adopted, there is a method of cutting the gel with a cutter, etc. and a method of cutting the gel by extruding with a meat chopper, etc. In the case of using a meat chopper, the bore size of the die of the meat chopper is usually no more than 5 cm, preferably no more than 2 cm, more preferably no more than 1 cm, and particularly preferably 1 to 7 mm.

Drying of the obtained granulated substance is performed usually at 50 to 140° C., preferably 60 to 130° C., and more preferably 70 to 120° C. The drying efficiency worsens when the drying temperature is too low, and there is a risk of quality degradation of the (co)polymer occurring if the drying temperature is too high.

The volatile component of the polymer powder after drying is usually 0.1 to 12% by mass from the viewpoint of easy handling. The powder tends to clump if the volatile component amount is great, and the particles will be soft and may be difficult to pulverize. Contrarily, in addition to requiring excessive heat and time in drying if reducing the volatile component amount too much, degradation of the (co)polymer due to overheating is a concern. It should be noted that the volatile component herein is mainly moisture.

If the particle size of the (co)polymer powder is too large, time will be required in dissolution, and if too small, will be a cause for the generation of so-called lumps during dissolution and degradation of the work environment due to powder, which are not preferable. Therefore, the particle size of the (co)polymer powder is usually 4 mesh-pass to 500 mesh-on, and preferably, it is good for at least 80% to fall in the range of 10 mesh-pass to 100 mesh-on, and preferably at least 90%.

An auxiliary agent may be used in order to suppress the adherence between particles upon crushing and grain refining. Usually, as an auxiliary agent, various oils such as polyalkylene glycols and silicone oil, surfactants, etc. are used. The auxiliary agent may be coated on the surface of a massive aqueous gel before pulverization, added together with the aqueous gel into a pulverizer, and may be mixed with the particulate gel after pulverization. Depending on the case, the auxiliary agent may be made to be present in the polymerization reaction aqueous system in advance. In addition, it is also useful to add a salt upon polymerization as shown in Patent Document 2. Processing is thereby facilitated by the adherence upon crushing of the gel.

If the aqueous gel is too soft or adhesiveness is too high upon crushing and grain refining, cutting by the cutter will not be possible and it will adhere. In addition, even if cutting is possible, the cutting speed thereof will decline. However, if an inorganic salt is made to be present in the polymerization system according to a preferred mode of the method of the present invention, the aqueous gel of the obtained (co)polymer will become an appropriate hardness; therefore, it will be possible to cut and grain refine easily.

In addition, when trying to produce (co)polymer of relatively low-molecular weight by the aqueous solution polymerization method, the aqueous gel of the produced polymer may become soft and processing of grain refining may no longer be possible by crushing, etc. of the gel. However, in a system made by having inorganic salt present following a preferred mode of the method of the present invention, even in a case of producing (co)polymer of lower molecular weight than normally, since the aqueous gel of the produced polymer will have a hardness for easy handling, it is possible to perform grain refining processing with normal equipment.

In order to obtain N-vinylcarboxamide (co)polymer of a broad molecular weight distribution, two or more N-vinylcarboxamide (co)polymers of different reduced viscosity may be mixed. Upon doing so, it is preferable for the reduced viscosity of the N-vinylcarboxamide (co)polymer after mixing to be 2 to 9.

(Hydrolysis)

Next, a part or the entirety of the N-vinylcarboxamide (co)polymer is hydrolyzed and converted into polyvinylamine.

The hydrolysis reaction is carried out under the presence of alkali. The hydrolysis is possible under both acidic and basic conditions; however, the equipment corrosion is less with alkali. As the type of alkali, although it is not limited so long as being able to hydrolyze the N-vinylcarboxamide (co)polymer, sodium hydroxide, potassium hydroxide, lithium hydroxide, calcium hydroxide, etc. can be specifically exemplified. These alkalis may be used independently, or may be used as mixtures. The amount of alkali differs depending on the desired hydrolysis rate; however, it is usually 10 to 1 equivalents relative to vinyl amine units in the objective polyvinylamine. It should be noted that a case of substances that more easily hydrolyze than the N-vinyl amide group in the hydrolysis reaction system coexisting requires to excessively use an amount offsetting this as a matter of course.

The addition order of required components in the hydrolysis reaction is preferably adding the entire amount of (co)polymer powder to the alkali aqueous solution to dissolve. There reason thereof is as follows. More specifically, this is because, although it is also possible to dissolve and add the (co)polymer powder after, in the case of wanting to dissolve the (co)polymer of the molecular weight aimed by the present invention, since the viscosity of the aqueous solution will be very great, a long time will be required in uniform mixing when adding the alkali after, and insoluble matter, etc. will be produced.

Although the aqueous solvent is basically water, it is allowable even if using a mixed solvent containing another organic solvent in order to adjust the solubility of the polymer. As specific examples of the organic solvent, methanol, ethanol, isopropanol, acetone, acetonitrile, etc. can be exemplified.

In addition, neutral salts may be included in the solvent. As specific examples of the salts, chlorides such as sodium chloride, potassium chloride, ammonium chloride, calcium chloride and zinc chloride; nitrates such as sodium nitrate and potassium nitrate; sulfates such as sodium sulfate and ammonium sulfate; phosphates such as sodium phosphate and ammonium phosphate; organic salts such as sodium acetate and sodium formate; etc. can be exemplified. These salts have use for adjusting the solution viscosity.

Furthermore, hydrolysis is conducted under the presence of an antigelling agent. Although any well-known compound can be used as the antigelling agent, it is favorable to use one that is stable with alkalinity and having an aldehyde capturing function in the present invention. As specific examples of such an antigelling agent, dithionite, sulfite, hydrogensulfite, disulfite, Rongalite (sulfoxylate formaldehyde adduct), thioureadioxide, sodium borohydride, etc. can be exemplified. In the case of salt, any type thereof can be selected, and for example, alkali metal salts of sodium, potassium, lithium, etc., alkali earth metal salts of calcium, magnesium, zinc, etc., ammonium salts, etc. can be exemplified. These antigelling agents can employ any one type or more as a mixture.

Among these antigelling agents, since sulfite, hydrogensulfite and disulfite have somewhat weak aldehyde capturing ability compared to other antigelling agents, it is necessary to increase the added amount. Therefore, in a performance sense, dithionite, Rongalite, thioureadioxide and sodium borohydride are particularly superior. Thereamong, dithionite is somewhat unstable in air and requires caution in handling. In addition, sodium borohydride may produce hydrogen bubbles in reaction and in product storage, and thus requires caution.

The added amount of antigelling agent depends also on the residual monomer amount in the (co)polymer; however, it is usually 0.01 to 20% by mass, preferably 0.1 to 10% by mass, and more preferably 0.2 to 5% by mass relative to the (co)polymer.

The antigelling agent is preferably dissolved in advance in an aqueous solvent prior to dissolving the (co)polymer powder. Although it is certainly possible to dissolve and add after, since the (co)polymer solution viscosity will be very great, uniform mixing is difficult when adding the antigelling agent after. In addition, the antigelling agent may be made to dissolve simultaneously with the (co)polymer powder. Furthermore, since the antigelling agent is made commercially available as a powder usually, it is possible to blend with the (co)polymer powder to make a composition. In addition, the antigelling agent is relatively stable, and thus is advantageous in being able to be stored for a long time as a composition. This composition can be handled easily, and the blending ratio of the antigelling agent relative to the (co)polymer is also constant; therefore, the composition can be dissolved in an alkali aqueous solution as is and then subjected to hydrolysis.

The (co)polymer concentration in the aqueous solvent must be appropriate selected in order to carry out uniform hydrolysis. The (co)polymer concentration is decided with a good balance between the ability of the dissolving equipment and the economics such as production efficiency and transport cost. The concentration is preferably at least 1% by mass, more preferably at least 2% by mass, even more preferably at least 3% by mass, and particularly preferably at least 5% by mass. In addition, the concentration is preferably no more than 30% by mass, more preferably no more than 25% by mass, and even more preferably no more than 20% by mass.

Although the style of the dissolving equipment is not particularly limited, it is essential that it is able to effectively agitate high-viscosity liquids. More specifically, it is possible to use a solid-liquid mixing device of stirring vessel type, pump type, extruder type, kneading type, etc. In addition, the mixing blades can employ helical ribbon blades or the like suited to the stirring of high-viscosity liquids.

After dissolving the (co)polymer, the dissolved solution is heated to carry out hydrolysis. The conditions of hydrolysis changes according to the (co)polymer concentration and alkali concentration; however, it is normally 30 to 180° C., preferably 40 to 140° C., and more preferably 50 to 100° C. The heating time is sufficient so long as determined according to the desired hydrolysis rate; however, if heating for a long time at high temperature, there is a risk of promoting degradation. Therefore, the heating time is normally within 48 hours, preferably within 24 hours, and more preferably within 12 hours. In order to more effectively carry out antigelling, the initial stage of hydrolysis ideally carries out a reaction at somewhat low temperature. Normally, the conditions of the initial reaction are 0.5 to 24 hours at 30 to 60° C. Subsequently, the temperature suited to hydrolysis rises and the reaction continues.

The equipment used in hydrolysis is not particularly limited so long as able to heat the (co)polymer solution. Normally, a device suited to mixing of high-viscosity liquids such as of stirring vessel type, pump type, extruder type and kneading type is used, and a heating method by way of a heat medium such as hot water, steam and hot oil from outside is adopted. The reaction may be continually carried out in a device in which dissolution of the (co)polymer is carried out. On the other hand, if the reaction temperature is raised, hydrolysis will be possible in a very short heating time, and in this case, the selection of equipment becomes very broad and, for example, heating methods by way of a heat exchanger of multi-tube type, plate type, wet-wall type, thin-membrane type, etc., microwaves, infrared rays, etc. can be exemplified.

Using the above-mentioned such heating device, it is possible to carry out the hydrolysis reaction at the location of use of the polyvinylamine, e.g., papermaking plant or wastewater treatment plant. In other words, it is possible to transport the (co)polymer as a powder, and after preparing as a dissolved solution, heat and hydrolyze when necessary, and directly introduce to the equipment for use, i.e. papermaking machine or wastewater treatment system. The production when required of polyvinylamine at the location of use does not require production of a diluted polyvinylamine aqueous solution, or to maintain a large facility for storage. In addition, since it can be transported as (co)polymer powder to the location of use, it is not necessary to transport a diluted solution, which can reduce transport cost, and thus is economically advantageous. Furthermore, since there is no need to store a polyvinylamine aqueous solution, which tends to degrade, for a long time, it is advantageous also in quality. To the polyvinylamine solution prepared when necessary in this way, dilution, pH adjustment, the addition of other chemical agents, etc. may be further carried out, immediately prior to introduction to the equipment for use. It should be noted that the concentration of the vinylamine unit-containing (co)polymer solution obtained by hydrolysis is adjusted as appropriate according to the intended use.

(Polyvinylamine Aqueous Solution)

When hydrolysis completes, it becomes an aqueous solution of polyvinylamine. Although differing according to the concentration at the time of hydrolysis, a 1 to 30% by mass aqueous solution is obtained. The concentration may be adjusted so that the handling properties are good. The preferred concentration is 2 to 25% by mass, and more preferably 3 to 30% by mass, depending on the molecular weight of the (co)polymer. In the case of being lower concentration than this, irrespective of the molecular weight distribution, the liquid viscosity lowers and the handling properties improve; however, costs such as for transport increase. In the case of being higher than this, depending on the molecular weight of the polymer, the liquid viscosity will become too high irrespective of the molecular weight distribution.

The polyvinylamine can be applied to a variety of fields, and particularly in the case of using as a papermaking chemical in the papermaking industry, above all as a retention and drainage aid, as a flocculant in the wastewater treatment, high-molecular weight polyvinylamines are said to be effective; however, according to the present invention, at least equivalent performance is obtained without using polyvinylamines having a reducing viscosity of 9 or higher, which have been recommended in the past. Furthermore, the handling properties as an aqueous solution are also favorable.

According to the present invention, a high-molecular weight polyvinylamine solution product can be efficiently produced on an industrial scale under alkaline conditions. Alkaline conditions are advantageous in having few limitations in the equipment for the production, transport, storage and use of the product. In addition, as a result of the margin for selection of equipment becoming extensive, it is possible to carry out the hydrolysis reaction at the papermaking plant or wastewater treatment facility, and thus is advantageous economically and in quality.

EXAMPLES

Next, the present invention will be explained in further detail by way of examples; however, the present invention is not to be limited to the following examples, so long as not exceeding the spirit thereof. It should be noted that the properties of the (co)polymers of the examples and comparative examples were measured according to the following methods.

(Measurement of Reduced Viscosity)

The (co)polymer sample was dissolved to a 0.1 g/dl concentration as net weight in a 1N brine solution, and the flow-down time was measured using an Ostwald viscometer at 25° C. Similarly, the flow-down time of the 1N brine solution was measured, and the reduced viscosity was obtained according to Formula 1 below.

$$\text{Reduced Viscosity } (\eta_{sp}/C) = (t-t_0)/t_0/0.1 \ [dL/g] \quad \text{(Formula 1)}$$

t: flow-down time of the sample solution (sec)

$t_0$: flow-down time of 1N brine (sec)

(Measurement of Polymerization Conversion Rate)

The (co)polymer powder was extracted with methanol and water, and the residual monomer was analyzed employing liquid chromatography. As the main impurities, N-vinylcarboxamide and a water adduct of N-vinylcarboxamide were detected, the total of these were obtained by N-vinylcarboxamide conversion and defined as the residual monomer amount, and by correcting for the volatile component amount obtained separately, the conversion rate was calculated.

(Volatile Component Amount)

The (co)polymer powder was heated for 90 minutes at 105° C., and the decreased amount was obtained by a gravimetric method.

(Measurement of Aqueous Solution Viscosity)

The temperature of the polymer aqueous solution was set to 25° C., and was measured with a Brookfield viscometer at conditions of 6 rpm and rotor No. 4. It should be noted that the viscosity is written as mPa·s.

Example 1

Synthesis and Performance Evaluation of Polymer
A: Aqueous Standing Adiabatic Polymerization Method Polyethylene glycol (average molecular weight: 20000) in an amount of 0.3 parts by mass was dissolved in 70 parts by mass of deionized water, and then mixed with 30 parts by mass of N-vinyl formamide (99 wt % purity). Furthermore, the monomer aqueous solution was adjusted to pH=6.3 with phosphoric acid after the addition of 0.1 parts by mass of sodium acetate to obtain the monomer preparation.

After cooling this monomer preparation to 0° C., it was transferred to an adiabatic reaction vessel equipped with a thermometer and was nitrogen purge for 15 minutes, followed by adding 1500 ppm of 2,2'-azobis(2-amidinopropane)dihydrochloride (tradename: "V-50" manufactured by Wako Junyako Co., Ltd.) and 200 ppm (relative to monomer) of t-butyl hydroperoxide (tradename: "Perbutyl H-69" manufactured by Nippon Oils & Fats Co., Ltd.) as a 10% by mass aqueous solution, and subsequently, 600 ppm (relative to monomer) of ferrous sulfate 7-hydrate was added as a 10% by mass aqueous solution, thereby initiating polymerization.

The highest point for the temperature in the system after 240 minutes from polymerization initiation was confirmed, and subsequently, was held in the reaction vessel for a further 60 minutes. Subsequently, the produced polymer was withdrawn from the reaction vessel to obtain an N-vinyl formamide polymer gel excelling in handling properties.

The N-vinyl formamide gel polymer gel was cut in 3 cm squares, the cut gel segments were processed with a meat chopper having a 4.8 mm die bore to make the gel fragments into particles granulated to no more than 5 mm squares. The obtained gel particles maintained the shape of fine particles, and had favorable handling properties.

Next, the particles were dried for 2 hours at 80° C., and the dried particles were pulverized with a Wiley-type pulverizer to make powder form (particle size of 10 mesh-pass to 100 mesh-on: at least 95%). As a result of measuring the physical properties for the obtained powder of N-vinyl formamide polymer, the reduced viscosity was 7.2 (dl/g), polymerization conversion rate was 99.7%, and the volatile component was 3.2% by mass. In addition, Mw/Mn measured by GPC method was 11.58. Defining this polymer as Polymer A, the below property and performance evaluations of the polymer solution were conducted.

Example 2

Synthesis and Performance Evaluation of Polymer B: Aqueous Solution Standing Adiabatic Polymerization Method Except for increasing the amount of 2,2'-azobis(2-amidinopropane)dihydrochloride to 2000 ppm, N-vinyl formamide polymer powder with a reduced viscosity of 5.8 dl/g was obtained performing polymerization by the same method as Polymer A. The polymerization conversion rate was 99.8%, and the volatile component amount was 4.5% by mass. Mw/Mn measured by the GPC method was 6.5. Defining this product as Polymer B, the below property and performance evaluations of the polymer solution were conducted.

(Synthesis of Polymer C: Aqueous Standing Adiabatic Polymerization Method)

Except for increasing the amount of 2,2'-azobis(2-amidinopropane)dihydrochloride to 2500 ppm, N-vinyl formamide polymer powder with a reduced viscosity of 3.9 dl/g was obtained performing polymerization by the same method as Polymer A. The polymerization conversion rate was 99.8%, and the volatile component amount was 4.5% by mass. Mw/Mn measured by the GPC method was 5.1. This product was defined as Polymer C.

Example 3

Preparation and Performance Evaluation of Polymer D

The Polymer C and the Polymer A were mixed so as to be 70%/30% by mass, and defined as Polymer D. Upon analyzing Polymer D, the reduced viscosity was 6.4 dl/g, polymerization conversion rate was 99.8%, and the volatile component amount was 4.5% by mass. Mw/Mn measured by the GPC method was 9.1. The below property and performance evaluations of the polymer solution were conducted for this Polymer D.

Comparative Example 1

Synthesis and Performance Evaluation of Polymer E: Photopolymerization Method

A monomer solution was prepared by uniformly dissolving 333.3 g of N-vinyl formamide (99% purity) as the monomer, 0.11 g of diphenyl(2,4,6-trimethylbenzoyl)phosphine oxide as the initiator, 5.5 g of ammonium chloride, 0.55 g of "SANISOL B50" (benzalkonium chloride-based surfactant manufactured by Kao Corp., 50% purity), 0.055 g of "AF108" (surfactant manufactured by Toho Chemical Industry Co., Ltd.), and 210.5 g of desalted water, then nitrogen gas is supplied hereinto to remove dissolved oxygen.

To the bottom surface of a tray-shaped container (bottom surface 235 mm×235 mm) with a bottom made of stainless steel, a polyethylene terephthalate film (base film 12 μm thick, PVDC coat 4 μm thick) was spread, the monomer solution was placed herein, and the top part was covered with a polyethylene terephthalate film. From above, a fluorescent chemical lamp was irradiated so as to be an intensity of 3 W/m² at the irradiated surface. During the irradiation period, 10° C. cold water was sprayed on the stainless steel surfaces of the container to remove the heat of polymerization. The temperature that was 15° C. prior to irradiation reached the highest of 42° C. after 90 minutes. After 120 minutes from irradiation initiation, the irradiation intensity was raised to 6.5 W/m², and polymerization was continued for further 60 minutes. An uncolored clear gel of N-vinyl formamide polymer was obtained.

The gel was pulverized with a meat chopper to make particles of about 4 to 5 mm, followed by drying for 2 hours with an 80° C. forced-air drier. Subsequently, it was re-pulverized with a rotating-type pulverizer having a 1-mm φ screen, to obtain powder of the N-vinyl formamide polymer. The volatile component amount was 4.7% by mass, and the polymerization conversion rate was 98.7%. In addition, the reduced viscosity was 11.6 dl/g. Mw/Mn measured by the GPC method was 4.6. Defining this product as Polymer E, the below property and performance evaluations of the polymer solution were conducted.

Comparative Example 2

Synthesis and Performance Evaluation of Polymer F

Except for increasing the amount of diphenyl(2,4,6-trimethylbenzoyl)phosphine oxide to 0.55 g, a N-vinyl formamide polymer powder with a reduced viscosity of 8.3 dl/g was obtained by performing polymerization with the same method as Polymer B. The polymerization conversion rate was 99.0%, and the volatile component amount was 4% by mass. Mw/Mn measured by the GPC method was 4.2. Defining this product as Polymer F, the following property and performance evaluations of the polymer solution were conducted.

(Solution Hydrolysis Method)

To a separable flask made of glass having a mixer, 275.2 g of desalted water was placed, and 8.45 g of sodium hydroxide and 0.75 g of sodium dithionite as the antigelling agent were dissolved therein, 15 g of the N-vinylcarboxamide polymer net weight was added gradually under stirring, and after stirring for 1 hour at room temperature, was heated to 50° C. After 2 hours, it was further heated to 80° C., and hydrolysis was carried out while keeping at 80° C. for 2 hours. After cooling, the polyvinylamine solution of the contents was withdrawn. The aqueous solution viscosity of polyvinylamine was measured, and is shown in Table 1.

(Evaluation Methods of Drainage Property and Water Squeezability)

After soaking cardboard in water, the concentration was adjusted by beating for 20 minutes using a beater, and a test slurry with a Canada standard freeness (CFS)=90, 1% concentration and pH 6.91 was obtained. Then, the drainage property was evaluated in the following way. In other words, to 500 ml slurry as the freeness agent, 200 ppm (relative to cardboard) of the polyvinylamine solution as polymer net weight was added, and stirred for 20 seconds at 900 rpm by a paddle blade, then subsequently the drainage amount after 10 seconds was measured with a dynamic drainage tester (Kumagai Riki Kogyo Co., Ltd.). On the other hand, using the same slurry, a papermaking, paper sheet was sandwiched by filter cloth manually using a square-type sheet machine, and by pressing with a press machine for 5 minutes at 0.4 MPa and for a further 2 minutes at 0.4 MPa, then testing the water content ratio in this state, the standard of water-squeezability was established. The results are shown in Table 1.

As shown in Table 1, the polyvinylamines produced by hydrolyzing Polymers A, B, D and E show substantially the same drainage property and water-squeezability; however, Polymer E has high solution viscosity and thus poor handling properties. The polyvinylamine produced by hydrolyzing Polymer F has substantially the same handling properties as Polymers A, B and D; however, it is poor from a performance aspect (drainage property and water-squeezability).

The invention claimed is:

1. A method for producing a vinyl amine unit-comprising polymer solution comprising: producing a polymer comprising N-vinylcarboxamide monomer units and having a value of weight average molecular weight Mw/number average molecular weight Mn of at least 5 by an aqueous solution standing adiabatic polymerization method, and then performing hydrolysis on the polymer in an aqueous solvent under the presence of alkali and an antigelling agent.

2. The method according to claim 1, wherein the N-vinylcarboxamide monomer units in the polymer are at least 50 mol % of all monomer units in the polymer.

3. The method according to claim 1, wherein the N-vinylcarboxamide monomer units are N-vinylformamide monomer units.

4. The method according to claim 1, wherein the antigelling agent is at least one selected from the group consisting of dithionite, sulfite, hydrogensulfite, disulfite, sulfoxylate formaldehyde adduct, thioureadioxide and sodium borohydride.

5. The method according to claim 1, wherein reduced viscosity of 0.1 g/dl of the polymer in a 1N brine is 2 to 9.

6. The method according to claim 1, wherein polymer concentration in the aqueous solvent upon performing hydrolysis is at least 3% by mass.

7. The method according to claim 1, wherein polymer concentration in the aqueous solvent is at least 3% by mass.

8. A method for producing the polymer solution according to claim 1, wherein the polymer comprising N-vinylcarboxamide monomer units after being produced by aqueous solution standing adiabatic polymerization, is then dried and powderized to obtain polymer powder having 0.1 to 12% by mass of volatile components, followed by performing hydrolysis on the powder obtained in said aqueous solvent under the presence of said alkali and said antigelling agent.

9. The method for producing a polymer solution according to claim 8, comprising transporting the polymer powder obtained to a location of use of the polymer solution, and

TABLE 1

|  |  | Polymerization method | Mw/Mn | Reduced viscosity (dl/g) | Polyvinylamine aqueous solution viscosity (mPa · s) | Drainage property (ml) | Water-squeezability (% by mass) |
|---|---|---|---|---|---|---|---|
| Example 1 | Polymer A | Adiabatic polymerization | 11.6 | 7.2 | 4500 | 110 | 78.5 |
| Example 2 | Polymer B | Adiabatic polymerization | 6.5 | 5.8 | 2600 | 105 | 82.2 |
| Example 3 | Polymer D (Polymer A + Polymer C) | Adiabatic polymerization | 9.1 | 6.4 | 4000 | 110 | 81.1 |
| Comparative Example 1 | Polymer E | Photopolymerization | 4.6 | 11.6 | 12000 | 108 | 83.0 |
| Comparative Example 2 | Polymer F | Photopolymerization | 4.2 | 8.3 | 6000 | 90 | 95.0 | performing hydrolysis on the polymer powder in an aqueous solvent under the presence of alkali and an antigelling agent at the location of use.

10. The method according to claim 1, wherein the polymer comprising N-vinylcarboxamide monomer units is a mixture of at least two N-vinylcarboxamide polymers having different reduced viscosities.

11. A retention and drainage aid for papermaking comprising the vinylamine unit-containing polymer solution according to claim 1.

* * * * *